(12) United States Patent
Tawney et al.

(10) Patent No.: US 7,808,618 B1
(45) Date of Patent: Oct. 5, 2010

(54) METHODS AND APPARATUS FOR PROVIDING A SEMICONDUCTOR OPTICAL FLEXURED MASS ACCELEROMETER

(75) Inventors: Jesse Tawney, Wilmington, MA (US); Farhad Hakimi, Watertown, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 379 days.

(21) Appl. No.: 11/971,333

(22) Filed: Jan. 9, 2008

(51) Int. Cl.
*G01C 3/08* (2006.01)
*G01P 3/36* (2006.01)

(52) U.S. Cl. .................................. 356/28.5; 356/4.09
(58) Field of Classification Search ............... 356/28.5, 356/459, 460, 4.09, 4.1; 385/12
See application file for complete search history.

(56) References Cited

U.S. PATENT DOCUMENTS

| | | | |
|---|---|---|---|
| 4,876,447 A | 10/1989 | Killian | |
| 4,900,918 A | 2/1990 | Killian | |
| 5,044,749 A | 9/1991 | Califano | |
| 5,061,069 A | 10/1991 | Califano | |
| 5,369,485 A | 11/1994 | Hofler | |
| 5,559,358 A * | 9/1996 | Burns et al. | 257/431 |
| 5,936,294 A * | 8/1999 | Zhang | 257/435 |
| 6,320,992 B1 * | 11/2001 | Goldner et al. | 385/13 |
| 6,494,095 B1 * | 12/2002 | Wan | 73/514.26 |
| 6,550,330 B1 | 4/2003 | Waters et al. | |
| 6,618,523 B2 | 9/2003 | Hall et al. | |
| 7,222,534 B2 | 5/2007 | Maas et al. | |
| 2009/0268211 A1 * | 10/2009 | Carr et al. | 356/498 |

OTHER PUBLICATIONS

Akiyama, S. et al., "40 Gb/s InP-based Mach-Zehnder Modulator with a driving voltage of 3 V", International Conference on Indium Phosbide and Related Materials, Conference Proceedings, 16th IPRM 31, pp. 581-584, Kagoshima, Japan, 2004.
Bach, H., "Ultrafast Efficient Photodiodes Exceeding 100 GHZ Bandwidth (Invited)" Conference Proceedings, 19th IPRM 14, pp. 71-76, Matsue, Japan, 2007.

(Continued)

*Primary Examiner*—Patrick J Connolly
(74) *Attorney, Agent, or Firm*—Ropes & Gray LLP (57) ABSTRACT

Methods and apparatus are provided for integrating various optical components onto a planar substrate using a single semiconductor material system to produce an accelerometer. A light beam is generated on the semiconductor optical accelerometer. The light beam is split to form two light beams using a multimode interference (MMI) coupler. One of the two light beams that is formed is directed towards a reference mirror and the other is directed towards a flexured mirror. The flexured mirror moves as a result of acceleration and thereby reflects the light beam with a different light beam characteristic. The light beams are combined by the MMI coupler to produce an interference light beam. A microprocessor measures acceleration based on the differences in light beam characteristics of the reflected light beams. Along the optical path light beam detectors measure various beam characteristics. The microprocessor accounts for characteristics measured by the detectors when computing acceleration.

24 Claims, 7 Drawing Sheets

OTHER PUBLICATIONS

Besse, P. "Optical Bandwidth and Fabrication Tolerances of Multimode Interference Couplers", Journal of Lightwave Technology, vol. 12, No. 6, pp. 1004-1009, 1994.

Hill, M. et al., "Optimizing Imbalance and Loss in p. 3 pos 4 2×2 3-dB Multimode Interference Couplers via Access Waveguide Width", Journal of Lightwave Technology, vol. 21, No. 10, pp. 2305-2313, 2003.

Liang, J-H. et al., "High-Power High-Efficiency Superluminescent Diodes with J-Shaped Ridge Waveguide Structure", IEEE, pp. 119-122, 2002.

Mohseni, H. et al., "Highly linear and efficient phase modulators based on GaInAsP-InP three-step quantum wells", Applied Physics Letters 86, 031103, 2005.

* cited by examiner

METHODS AND APPARATUS FOR PROVIDING A SEMICONDUCTOR OPTICAL FLEXURED MASS ACCELEROMETER

FIELD OF THE INVENTION

The present invention is directed to methods and apparatus for providing a semiconductor optical flexured mass accelerometer, and more particularly to integrating various optical components onto a planar substrate using a single semiconductor material system.

BACKGROUND OF THE INVENTION

Conventional optical accelerometers are manufactured from discrete components that are used to direct light in various directions in order to ultimately measure acceleration based on changes in the light. Each of these discrete components is manufactured separately and is placed at a different location on the accelerometer body. Typically, some of these components include polarizers, polarized beam splitters ("PBS") and static mirrors that direct the light beam towards different detectors and moving parts (e.g., a proof mass mirror or flexured mirror).

The conventional optical accelerometers measure acceleration using a Michelson interferometer assembly. Each of the discrete components must be carefully aligned to direct a light towards a measurement assembly. The components must also be positioned and aligned to receive the light and split it to produce various light beams of different phases. Some of the split beams are directed towards a detector and the other beams are directed towards a flexured mirror. The beams are reflected by the flexured mirror and then passed through PBS which must be aligned to combine the reflected beams with the beams not reflected by the flexured mirror. The PBS must also be aligned to direct the combined beams towards a detector that ultimately determines acceleration based on phase changes of the received beams.

The discrete components required in the measurement assembly typically occupy a large amount of space making it difficult to provide precise measurements of acceleration. Moreover, the discrete components are difficult to position and align to provide the desired behavior and are subject to be misaligned with changes in external conditions. More accurate measurements can be provided with multiple measurement assemblies. However, size limitations of the accelerometers restrict the ability to manufacture multiple measurement assemblies.

Additionally, phase differences in conventional systems are detected using commercial electronics such as operational amplifiers which can output imprecise values resulting from minor changes in environmental conditions, for example, temperature. Moreover, the PBS creates leakage light which can mix with principal waves and add coherently to create a nonlinear spurious acceleration signal. Removing errors caused by this signal requires calibration and additional computation and is inefficient.

Accordingly, it is desirable to provide enhanced methods and apparatus for determining acceleration.

SUMMARY OF THE INVENTION

In accordance with the principles of the present invention, methods and apparatus are provided for determining acceleration using an integrated optical mass accelerometer.

In some embodiments of the invention, an acceleration measurement assembly is constructed by monolithic integration using standard semiconductor batch processing techniques. This allows for mass production of optical circuits and a reduction in size and cost. Accordingly, multiple measurement assemblies which are not achievable in conventional systems can be combined to provide accurate acceleration measurements.

In some embodiments, an electro-optic modulator (i.e., semiconductor light source) is formed on a semiconductor substrate which may be III-V semiconductor material (e.g., AlGaAs/GaAs, InGaAsP/InP, or InGaAlAs/InP). The semiconductor light source may be implemented as a superluminescent or laser diode. A light beam generated by the light source traverses an optical path towards split and detect circuitry also formed on the semiconductor substrate. In one implementation, the optical path is formed by a waveguide structure implemented in the semiconductor device. The split and detect circuitry forms two beams and directs one of the two beams towards a static mirror and the second one of the two beams towards a flexured mirror. The split and detect circuitry combines the two beams reflected back by the mirrors and directs them towards a detector formed on the semiconductor substrate. The detector determines changes in characteristics of the reflected beams and provides this information to a processor for computing the acceleration based on the changed characteristics. The light beam received by split and detect circuitry from the light source may be further split before it leaves the semiconductor substrate and provided to various detectors for compensating for, for example, coupling efficiency and intensity changes. The detectors may output digital samples of a received light beam, an analog signal representation of a light beam, a digital representation of the light beam, or may include some processing power to extract characteristics of a received light beam and output the processed results to another component such as a microprocessor.

Polarizers and PBS are not required to direct the light beam through the semiconductor substrate towards the flexured mirror. Accordingly, a single polarization state can be maintained throughout the acceleration measurement process.

In some embodiments, split and detect circuitry includes a multimode interference coupler (MMI) that splits the received light beam into the two light beams that are ultimately reflected by the mirrors. The MMI receives the reflected beams and combines them into one beam to form an interference light beam.

In some embodiments, split and detect circuitry may include diagnostics and compensation circuitry for detecting various changes in the characteristics of the light beams before they leave the semiconductor substrate and after they are reflected by the external mirrors. These characteristics may be used to increase the accuracy of the acceleration computation by allowing for the compensation of, for example, hardware thermal expansion and contraction and changes in light intensity.

Multiple integrated optical accelerometer circuits may be strategically placed on a device so that numerous points on the flexured mirror, including the top and bottom of the flexured mirror are used in the acceleration measurement. As a result, flexure mechanical resonance can be measured. Mechanical resonance has a radial component that can be determined by comparing the acceleration measurements from, for example, the top and bottom of the accelerometer.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1A:
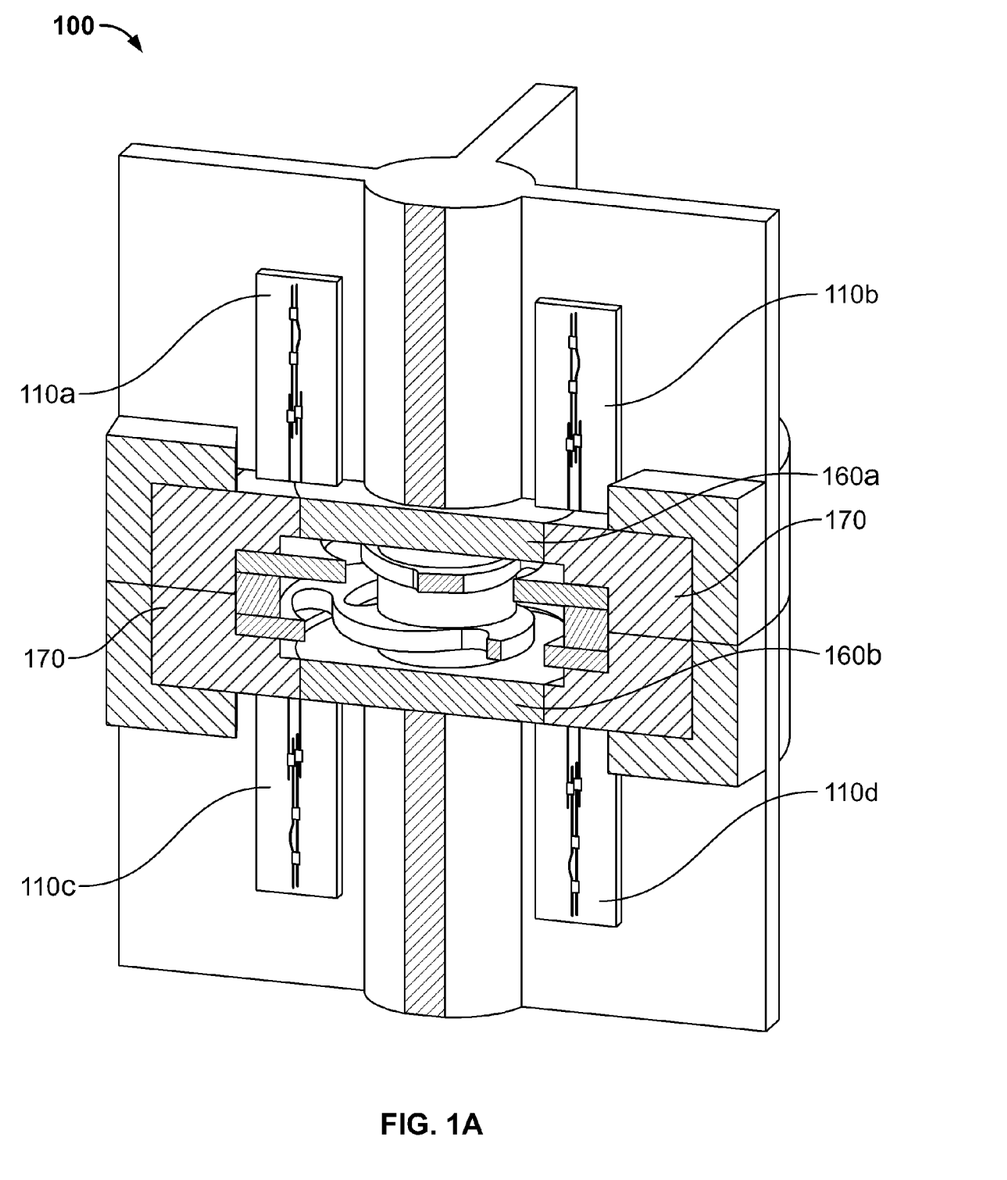
FIGS. 1A and 1B are three-dimensional diagrams of illustrative components of an optical accelerometer in accordance with an embodiment of the present invention.

FIG. 1A is a three-dimensional diagram of illustrative components of an optical accelerometer 100 in accordance with an embodiment of the present invention. The accelerometer 100 includes semiconductor optical accelerometers 110a-d, flexure cartridge assemblies 160a-b, and a static assembly 170. As defined herein, the term "accelerometer" refers to any body or system that includes one or more acceleration measurement devices and the term "semiconductor optical accelerometer" refers to an integrated circuit device that is placed in or on the accelerometer for providing a measurement of acceleration based on optical properties of light generated and measured by the device.

In the accelerometer 100, multiple semiconductor optical accelerometers 110a-d can be incorporated onto a single accelerometer body or system because of the size reduction achieved over the conventional accelerometer measurement devices. Although only four such optical accelerometers are shown in accelerometer 100, any number of additional semiconductor optical accelerometers can be provided without departing from the spirit of the invention. A more detailed discussion of how semiconductor optical accelerometers are used to compute acceleration is provided in connection with the description of FIG. 2. A more detailed discussion of the internal circuitry of semiconductor optical accelerometers 110a-d is provided in connection with the description of FIGS. 3-5.

Semiconductor optical accelerometers 110a-d are placed at different positions within, on or along the accelerometer body to detect changes in acceleration at different points of the flexured cartridge assemblies 160a-b. While multiple semiconductor optical accelerometers 110a-d are not necessary, as described above, the use of multiple semiconductor optical accelerometers, in certain embodiments, yields improved accuracy. For example, the acceleration measurements of the semiconductor optical accelerometer 110a and 110b positioned on the top portion of the body can be compared with each other to determine whether the flexure motion is in the same direction, meaning that the body was subjected to acceleration. Alternatively, radial acceleration may be determined (which may be due to resonance of the body) when the top two semiconductor optical accelerometers 110a and 110b provide acceleration measurements having values corresponding to different directions (i.e., one having a positive value and the other having a substantially equal negative value). Similar computations and analysis can be provided using the bottom two semiconductor optical accelerometers 110c and 110d. In particular, acceleration measurements provided by the top semiconductor optical accelerometers 110a and 110b can be compared with acceleration measurements provided by the bottom semiconductor optical accelerometers 110c and 110d to eliminate flexure motion that is unrelated to acceleration (e.g., resonance or noise).

Additionally, having numerous simultaneous acceleration measurements provided by each semiconductor optical accelerometer 110a-d allows for averaging of the acceleration computations to improve accuracy and performance. Such redundancy may increase life of the accelerometer since in the event of failure of one of the semiconductor optical accelerometers an average of the acceleration measurements provided by the functioning semiconductor optical accelerometers may provide substantially the same acceleration value as would have been provided had the semiconductor optical accelerometers not failed.

Figure 1B:
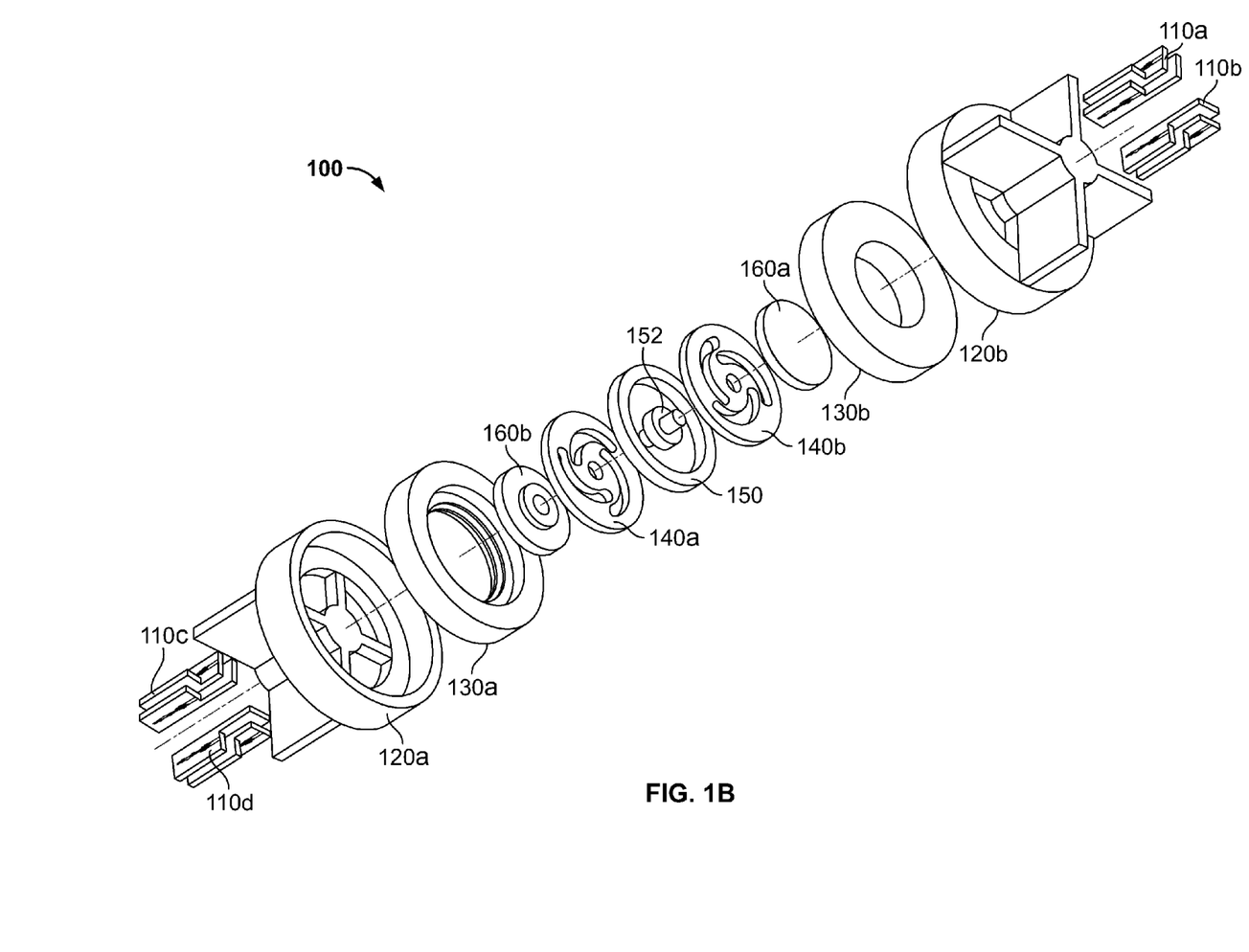

FIG. 1B is an exploded view of the optical accelerometer 100 in accordance with an embodiment of the present invention. The components of the accelerometer 100 include semiconductor optical accelerometers 110a-d, lower and upper housings 120a-b, lower and upper flexure cartridges 130a-b, lower and upper flexured mirrors 160a-b, lower and upper flexures 140a-b, flexure spacer 150 and proof mass 152. Flexures 140a-b are preferably fabricated using silicon wafers and an Inductively Coupled Plasma (ICP) etch process.

Each flexured mirror 160a-b is coupled to a respective flexure 140a-b and the proof mass 152. This arrangement allows the flexured mirror 160 to move relative to the remaining components (i.e., the optical accelerometers 110a-d, the lower and upper housings 120a-b, the lower and upper flexure cartridges 130a-b and reference mirror 170) as a result of acceleration. It should be understood that the description, above and below, referring to the motion of the flexured mirror refers to the motion of the flexured mirror relative to the remaining components of the accelerometer 100 including the reference mirror 170. Additionally, because the proof mass 152 has a constant value, a measure of acceleration can be obtained using known methods based on mass and an applied force. The flexure cartridges 130a-b enclose the flexured mirrors 160 and their associated components (i.e., lower and upper flexures 140a-b, flexure spacer 150 and proof mass 152). Reference mirrors 170 are part of the lower and upper housings 120a-b and do not move relative to the flexured mirrors as a result of acceleration. In particular, when the accelerometer 100 is subjected to acceleration, the only parts of the accelerometer 100 that move freely inside of the accelerometer 100 are the lower and upper flexured mirrors 160a-b, lower and upper flexures 140a-b, and proof mass 152.

In one implementation, for purposes of redundancy, each semiconductor optical accelerometer 110a-d includes two separate semiconductor optical accelerometers. In particular, as shown in the optical accelerometer 100, two integrated circuit devices are drawn for every semiconductor optical accelerometer 110a-d. Thus, there is a total of eight semiconductor optical accelerometers coupled to the accelerometer body in this implementation.

Semiconductor optical accelerometers are used to provide acceleration measurements by detecting changes in a light beam generated by the semiconductor optical accelerometer and reflected by various mirrors external to the semiconductor optical accelerometer. In particular, as discussed in more detail below, a light beam is generated by the semiconductor optical accelerometer and split into two beams. One of the two beams is directed towards a reference mirror while the other beam is directed towards the flexured mirror. Because the flexured mirror moves relative to the reference mirror, the beam reflected by the flexured mirror will have different characteristics from the beam reflected by the reference mirror. Thus, the two reflected beams can be combined and their relative differences can be measured to determine acceleration.

Figure 2:
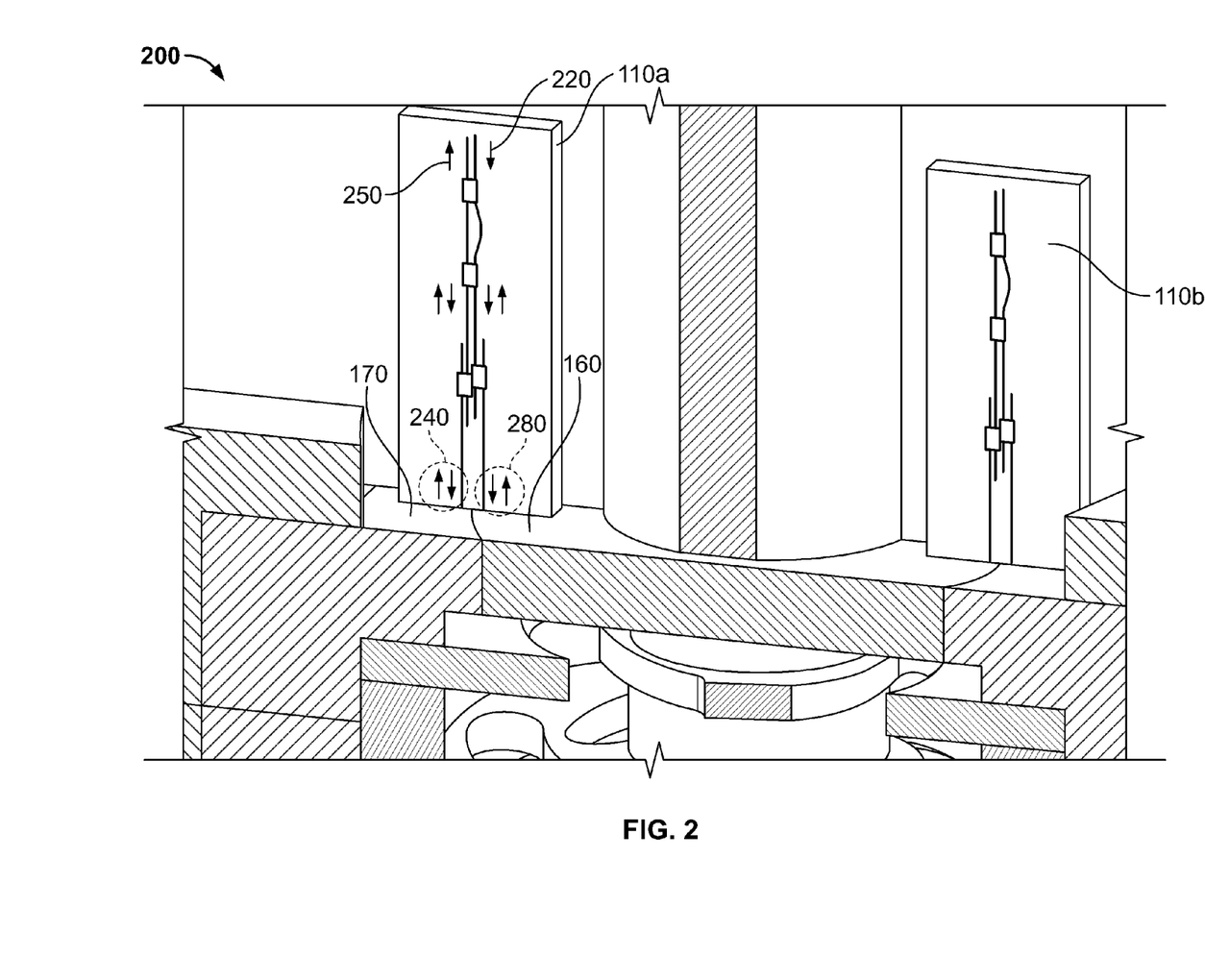
FIG. 2 is an enlarged view of an optical accelerometer in accordance with an embodiment of the present invention.

FIG. 2 is a detailed illustration of the process by which semiconductor optical accelerometers 110 compute acceleration in an accelerometer in accordance with an embodiment of the present invention. In particular, semiconductor optical accelerometer 110a includes a light source and split and detect circuitry that are formed on the semiconductor optical accelerometer which are used to generate and direct a light beam 220 towards flexured mirror 160 and reference mirror 170 (together referred to as "external mirrors") positioned on the accelerometer body. A detailed description of the light source and split and detect circuitry is omitted from the discussion of FIG. 2 for the sake of clarity and brevity, but will be provided in connection with the description of FIGS. 3-5.

The light beam 220 generated by the light source in semiconductor optical accelerometer 110a propagates towards the external mirrors of the accelerometer body. The flexured mirror 160 may be placed on a mass-spring assembly and moves relative to the reference mirror 170 (and the remaining portions of accelerometer 100) in accordance with the motion or acceleration to which the accelerometer body is subjected. As the light beam propagates through an optical path in the semiconductor optical accelerometer it is split into at least two portions. A first of the at least two portions, referred to as a second light beam, traverses a second optical path 240. A second of the at least two portions, referred to as a third light beam, traverses a third optical path 280. The second and the third optical paths 240 and 280 are parallel with respect to each other.

The second light beam propagating along the second optical path 240 is directed towards a static or reference mirror 170. The third light beam propagating along the third optical path 280 is directed towards the flexured mirror 160. Each of the second and third light beams leave the semiconductor optical accelerometer and propagate in free space towards the reference mirror 170 and the flexured mirror 160 (i.e., the external mirrors). The second and the third light beams are then reflected by the reference mirror 170 and the flexured mirror 160, respectively and directed back towards the respective optical path in semiconductor optical accelerometer.

The reflected light beams are received by the semiconductor optical accelerometer. The second reflected light beam is received and propagates along the second optical path 240 back towards the split and detect circuitry. Similarly, the third reflected light beam is received and propagates along the third optical path 280 back towards the split and detect circuitry. The light beams received by the split and detect circuitry are combined to form an interference light beam. Each reflected light beam has a relative phase term which is related to the propagation length from the point the light beam became separate (i.e., where the light beam split into the second and third light beam portions) to the same point at which they combine to form the interference light beam. Given that the optical path is substantially similar except for the propagation though the free space region (i.e., the distance to the reference mirror may be different from the distance to the flexured mirror making the free space propagation paths different), the relative wave characteristic (e.g., phase shift) is a function of the free space propagation.

For example, in the case of constant acceleration or velocity, the relative phase difference between the second reflected light beam (i.e., the light beam reflected by the reference mirror 170) and the third reflected light beam (i.e., the light beam reflected by the flexured mirror 160) remains constant. When the accelerometer body is subjected to acceleration, the external mirrors will move relative to one another. This results in a change of the relative path length between the two light beams propagating towards the reference mirror 170 and flexured mirror 160. Accordingly, the relative phase between the light beams also changes. Thus, a relationship between the flexured mirror 160 position relative to the reference mirror 170 and the relative phase of the two waves can be established in accordance with the following equation:

$$\Delta \phi = \frac{2\pi \cdot n \cdot \Delta L_x}{\lambda} + \frac{2\pi \cdot \Delta L_{freespace}}{\lambda} \qquad \text{Equation 1}$$

where n is the refractive index of the waveguide, $\lambda$ is the vacuum wavelength of the light, and $\Delta L_{oc}$ and $\Delta L_{freespace}$ are the differential path lengths the optical circuit and free space region due to acceleration, respectively.

Referring back to FIG. 2, the interference light beam is directed along a third optical path 250 towards a detector (not shown) formed on the semiconductor optical accelerometer. The detector determines acceleration of the body based on the characteristics of the reflected light beams, as discussed above. In particular, the detector determines characteristics of the interference beam and compares them to characteristics of the light beam generated by the light source. The determined characteristics may be intensity, phase, amplitude, frequency or any other type of light characteristic that can be used in computing acceleration based on changes of a light beam.

All of the optical paths which the light beams propagate through in the semiconductor optical accelerometer are preferably parallel relative to each other. Thus, internal mirrors and PBS devices are not needed to reflect and direct light beams in different directions towards internal or external components which contributes to the reduction in size of the semiconductor optical accelerometer and accelerometer body.

Figure 3:
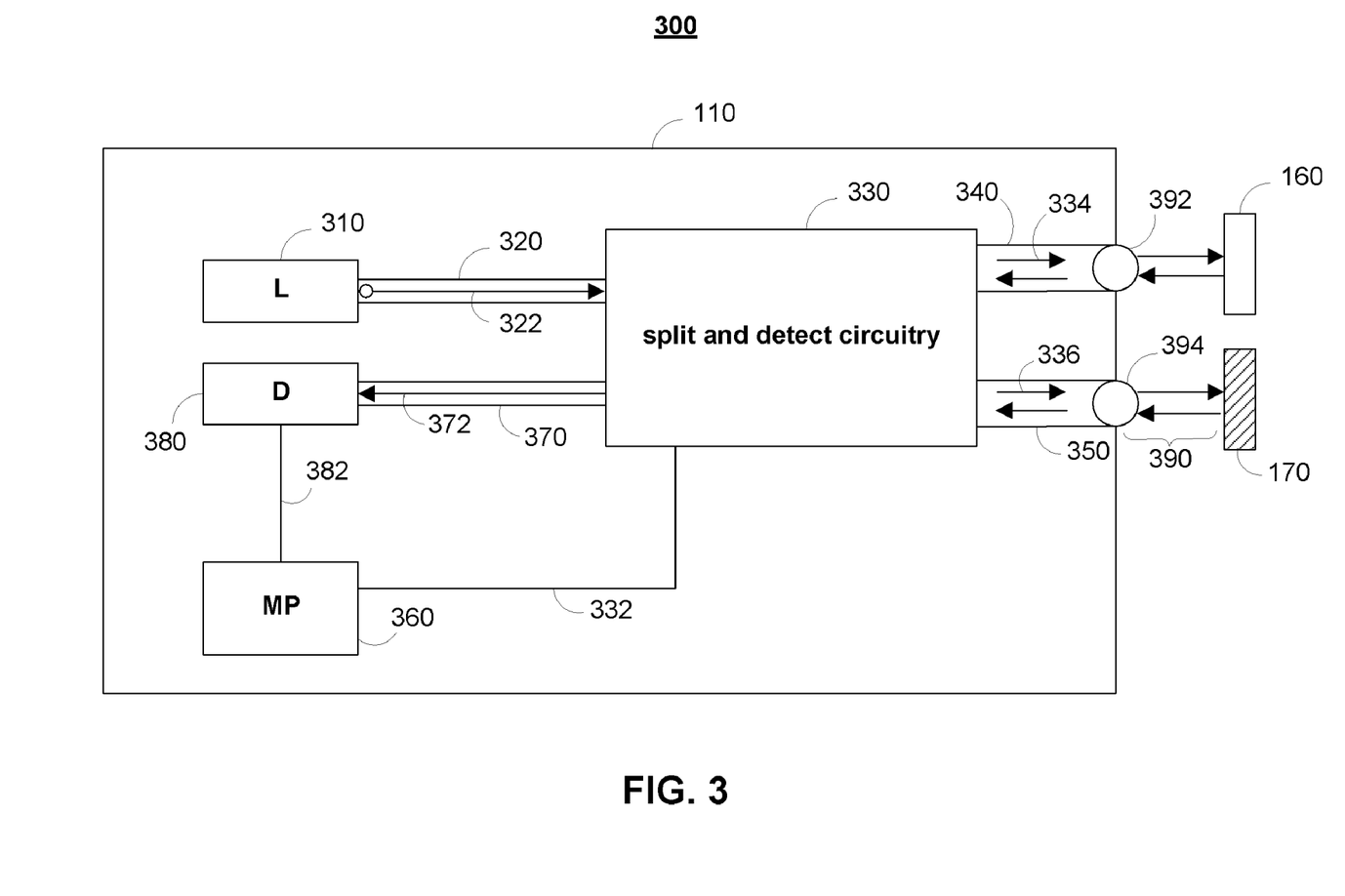
FIG. 3 is a schematic diagram of an illustrative semiconductor optical accelerometer for providing acceleration measurements in accordance with an embodiment of the present invention.

FIG. 3 is a diagram 300 of an illustrative semiconductor optical accelerometer 110 placed in the accelerometer 100 for providing acceleration measurements in accordance with an embodiment of the present invention. Semiconductor optical accelerometer 110 includes a semiconductor light source 310, split and detect circuitry 330, a detector 380 and a microprocessor 360.

Semiconductor light source 310 generates a light beam 322 and directs the light beam towards the split and detect circuitry 330 through a first optical path 320. Light beam 322 preferably traverses an optical path that is aligned along the normal of the reference mirror 170 and flexured mirror 160. Thus, as discussed below, there is no need to include polarizers, PBS devices, or mirrors within semiconductor optical accelerometer 110 for directing the light beam towards the external mirrors and receiving the light beam at the detector 380 after it is reflected.

Split and detect circuitry 330 is coupled to the first optical path 320 and receives the light beam 322 from semiconductor light source 310. Split and detect circuitry 330 splits the light beam into two portions. Split and detect circuitry 330 directs a first of the two portions 334 along a second optical path 340 towards the reference mirror 170. Split and detect circuitry 330 directs a second of the two portions 336 along a third optical path 350 towards the flexured mirror 160. Split and detect circuitry 330 will be discussed in more detail in connection with the description of FIG. 4.

Split and detect circuitry 330 may also analyze and detect characteristics of the light beam 322 before splitting and directing the beam portions towards the external mirrors. Analyzing and detecting characteristics of the light beam 322 before it is reflected by the external mirrors may allow for precise computations and compensations of, for example, intensity loss and coupling efficiency caused by the light leaving and re-entering the waveguide. Split and detect circuitry 330 may be coupled to the microprocessor 360 via path 332 to provide the detected characteristics of the light beam 322 in order to enable the microprocessor 360 to account for the characteristics in the computation of the acceleration.

The first beam portion 334 traverses through the second optical path 340. Second optical path 340 is preferably aligned along the normal of the external mirrors. The first beam portion 334 leaves the semiconductor optical accelerometer 110 through an end of the waveguide 392. The first beam portion 334 propagates through a free space region 390 and is reflected by the reference mirror 170 back towards the semiconductor optical accelerometer 110.

The second beam portion 336 traverses through the third optical path 350. Similar to the second optical path 340, the third optical path 350 is preferably also aligned along the normal of the external mirrors. The second beam portion 336 leaves the semiconductor optical accelerometer 110 through an end of the waveguide 394. The second beam portion 336 propagates through the free space region 390 and is reflected by the flexured mirror 160 back towards the semiconductor optical accelerometer 110.

When the accelerometer 100 is subject to motion that results in acceleration, the length of the free space region 390 between the end of the waveguide 394 of the semiconductor optical accelerometer 110 and the flexured mirror 160 is different (e.g., larger or smaller) than the length of the free space region 390 between the end of the waveguide 392 of the semiconductor optical accelerometer 110 and the reference mirror 170. This is because the flexured mirror 160 moves relative to the reference mirror 170 (and the other portions of the accelerometer) as a result of acceleration. Thus, as discussed above, the light beam portions reflected by the external mirrors when acceleration is present, have different phases as each of the light beam portions traverses a different path length.

The light beam portions reflected by the external mirrors are directed back towards the semiconductor optical accelerometer 110 through the ends of the waveguide 392 and 394. The reflected light beam portions propagate through optical paths 340 and 350 towards split and detect circuitry 330. Split and detect circuitry 330 may analyze and detect characteristics of the light beam portions reflected by the external mirrors to allow for precise computations and compensations of, for example, intensity loss and coupling efficiency caused by the light leaving and re-entering the waveguide. Split and detect circuitry 330 may output reflected beam characteristics to a microprocessor 360 via path 332. Split and detect circuitry 330 combines the beam portions to form an interference beam 372. The interference beam 372 is directed through a fourth optical path 370 towards the detector 380. A detector 380 is coupled to the fourth optical path 370 for receiving the interference beam 372. The fourth optical path is preferably aligned along the normal of the external mirrors.

The detector 380 determines light beam characteristics of the interference beam 372 and outputs that information via path 382 to the microprocessor 360. The microprocessor 360 receives the interference beam characteristics and computes acceleration based on the interference beam characteristics and adjusts the amount of the computed acceleration based on other compensation characteristics that may be received from split and detect circuitry 330. The acceleration may be computed in accordance with Equation 1 above or any other suitable manner.

Although microprocessor 360 is shown and described as being included within semiconductor optical accelerometer 110, one skilled in the art will appreciate that a centralized microprocessor may be provided external to semiconductor optical accelerometer 110 for receiving multiple light beam characteristics of various semiconductor optical accelerometers 110 positioned at different locations in accelerometer 100 and computing acceleration based on the received characteristics as discussed above. Such an arrangement may reduce the size of semiconductor optical accelerometer 110 and allow for a larger number of semiconductor optical accelerometers 110 to be positioned on accelerometer 100. Also, one skilled in the art will appreciate that the centralized microprocessor may be provided in addition to a microprocessor formed on the semiconductor optical accelerometer 110. In particular, each microprocessor formed on the semiconductor optical accelerometer 110 may process and compute acceleration and output those results to a centralized microprocessor. The centralized microprocessor may receive the computed accelerations from the various semiconductor optical accelerometers 110 and compute an acceleration based on those values. In some implementations, the centralized microprocessor may compute an average of the acceleration values it receives from the semiconductor optical accelerometers 110.

Additionally, accelerometer 100 may be part of a larger system that includes multiple accelerometers (each including multiple semiconductor optical accelerometers 110). Each accelerometer is used to determine acceleration along one particular axis. Accordingly, multiple accelerometers 100 may be included in the larger system to determine acceleration along multiple axes and also determine rotational acceleration. In such a system, each accelerometer may include a microprocessor for computing acceleration of its respective accelerometer and in turn a particular axis (based on the outputs of semiconductor optical accelerometers 110). The microprocessor in each of the accelerometers may output a computed acceleration to a centralized microprocessor included in the system. The centralized microprocessor, in turn, may perform computations (including acceleration of the system) based on the outputs of each of the accelerometers.

In some embodiments, the semiconductor optical accelerometer 110 may be constructed using two separate integrated circuits. For example, a first portion of semiconductor optical accelerometer 110 including the light source 310, detector 380 and microprocessor 360 may be formed on a first integrated circuit while split and detect circuitry 330 may be formed on a second integrated circuit. The optical paths 320 and 370 may couple the two integrated circuits using, for example, an optical fiber. Such an arrangement may reduce the total number of components on a particular semiconductor device or integrated circuit.

In these embodiments, each of the integrated circuits may be formed using a different material. For example, silica, polymer and lithium niobate may be used to produce the first or second integrated circuits. Silica can be used to produce a low loss waveguide structure upon which the semiconductor light source 310, detector 380 and modulators are formed. Polymer materials can also be used to create waveguide structures and some polymers possess an electro-optic constant which allows the creation of waveguide modulators. Lithium niobate is also capable of producing waveguides and phase modulators. As described above, the integrated circuit forms the optical paths using the waveguides formed from these materials.

Figure 4:
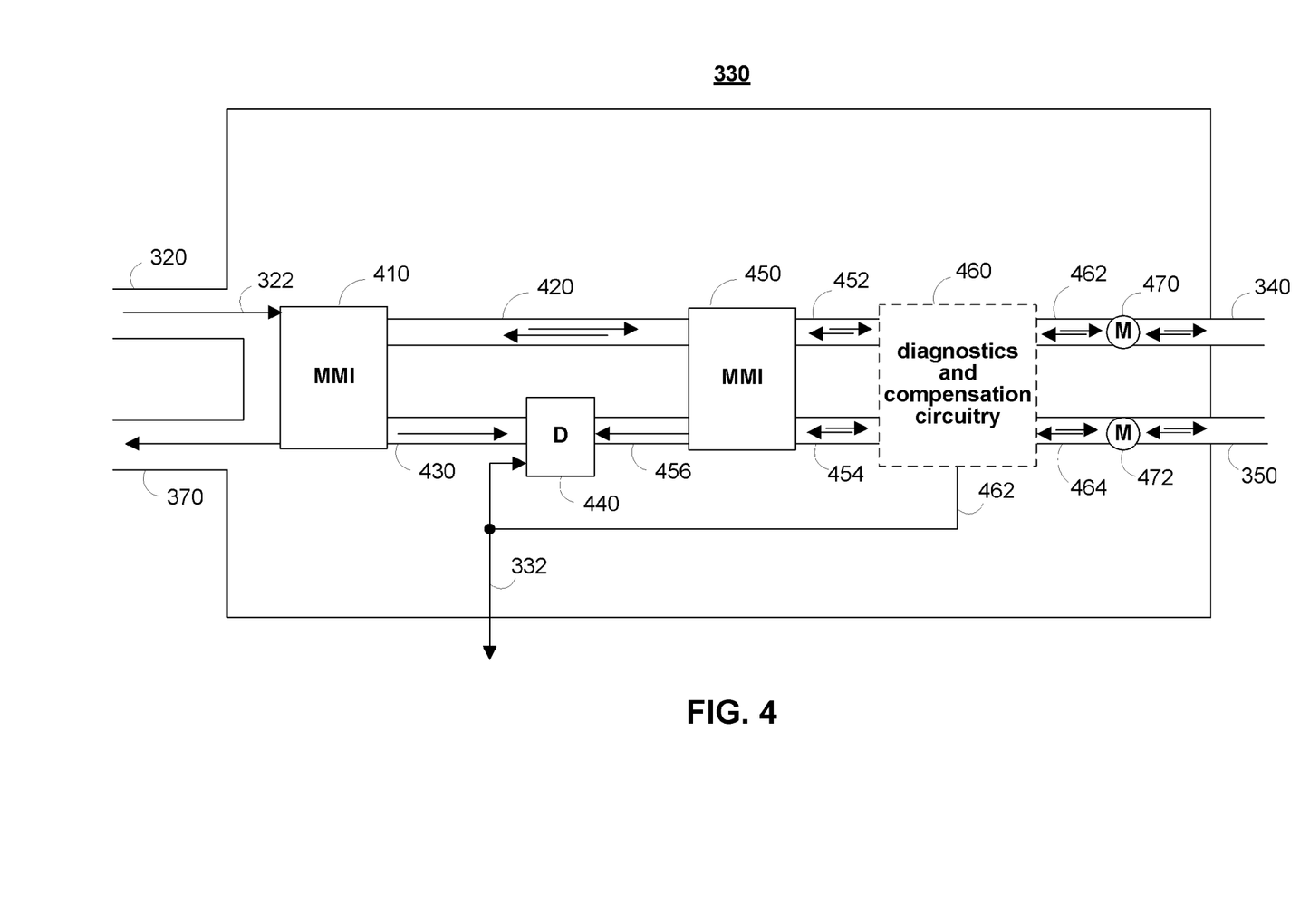
FIG. 4 is a schematic diagram of illustrative split and detect circuitry used in measuring acceleration in accordance with an embodiment of the present invention.

FIG. 4 is a diagram of an illustrative split and detect circuitry 330 used in measuring acceleration in accordance with an embodiment of the present invention. Split and detect circuitry 330 includes a first multimode interference (MMI) coupler 410, a detector 440, a second MMI coupler 450, diagnostics and compensation circuitry 460, and first and second mode converters 470 and 472. Split and detect circuitry 330 is coupled to the first optical path 320 and receives the light beam 322 generated by the light source. Each of the MMI couplers 410 and 450 is preferably a four port MMI coupler. The ports of the MMI coupler that are not used to ultimately direct the light beam toward the external mirrors may be used for diagnostics or compensation by directing the light beam towards a detector coupled to receive the light beam from the unused port of the MMI coupler.

The first MMI coupler 410 receives light beam 322 and splits and directs the light beam into two portions propagating along two parallel optical paths 420 and 430. Optical path 430 is coupled to a detector and optical path 420 is coupled to the second MMI coupler 450. Each of the optical paths is aligned along the normal of the external mirrors (not shown). The light beam portion propagating along optical path 430 is received by the detector 440. The detector 440 determines a light beam characteristic of light beam 322. In particular, detector 440 samples light beam 322 directly and measures intensity noise of the light beam before it is ultimately reflected by the external mirrors. The output of detector 440 is provided to the microprocessor (not shown) and is taken into account by the microprocessor when it computes acceleration which increases the noise performance of the accelerometer 100.

Optical path 420 is coupled to the second MMI coupler 450. The second MMI coupler 450 receives the light beam from the optical path 420, and splits and directs the light beam into two portions propagating along two parallel optical paths 452 and 454. In some embodiments, when further compensation is desired, diagnostics and compensation circuitry 460 is provided to receive the light beam portions from optical paths 452 and 454 and perform various detections and measurements. The detections and measurements are provided by diagnostics and compensation circuitry 460 to a processor for compensation of the computed acceleration via paths 462. Diagnostics and compensation circuitry 460 splits and directs the received beam portions into two portions propagating along two parallel optical paths 462 and 464 towards respective mode converters 470 and 472. Diagnostics and compensation circuitry 460 is discussed in more detail below in connection with the description of FIG. 5. In some embodiments, when no further compensation is desired, the optical paths 452 and 454 are coupled to respective mode converters 470 and 472. Mode converters 470 and 472 increase the mode size of the light beams prior to their leaving the semiconductor optical accelerometer 110. Increasing the mode size of the beams minimizes the divergence of the light beams while they traverse the free space 390 between the semiconductor optical accelerometer 110 and the external mirrors. As a result, the use of a lens to collimate the light beams can be avoided.

The light beam portions reflected by the external mirrors are received by split and detect circuitry 330 via optical paths 340 and 350. When further diagnostics or compensation is desired, the reflected beam portions are directed towards the diagnostics and compensation circuitry 460 through optical paths 462 and 464. The diagnostics and compensation circuitry 460 performs various measurements and directs the reflected light beam portions towards the second MMI coupler 450 through optical paths 452 and 454.

The second MMI coupler 450 receives and combines the two reflected light beam portions it receives through optical paths 452 and 454 to form an interference light beam. The second MMI coupler 450 directs the interference beam along two optical paths 420 and 456. Optical path 420 is directed towards the first MMI coupler 410 which directs the light beam along optical path 370 towards the detector 380 (FIG. 3). The interference light beam directed along optical path 456 is received by the detector 440. Detector 440 can be used to measure and monitor a light beam characteristic of the interference light beam of the light beams reflected by the external mirrors and output its measurement to a microprocessor via path 332. In some implementations, while detector 440 measures light beam characteristics of the light beam it receives from path 430 (as discussed above), detector 440 may act as a termination point (i.e., not perform any measurements or computations) for the light beam it receives from path 456.

It should be understood that, although detector 440 is drawn as one component in FIG. 4, detector 440 may be implemented as two separate detectors each coupled to receive and measure characteristics of a respective light beam and output those measurements to the microprocessor.

Diagnostics and compensation circuitry 460 may be used to perform various diagnostics and additional compensations for providing a precise measurement of acceleration. In particular, diagnostics and compensation circuitry 460 includes additional MMI couplers with ports coupled to detectors used to measure characteristics of the light beams on the way to the external mirrors and after they are reflected by the external mirrors. Some of the characteristics that diagnostics and compensation circuitry 460 can be used to measure include coupling efficiency and residual intensity modulation. In particular, coupling efficiency refers to a ratio of the amount of light that is received (coupled back) by the integrated circuit after being reflected by the external mirrors versus the amount of light that initially exits the integrated circuit. In a non-ideal environment, not all of the light that exits the integrated circuit is coupled back into the integrated circuit and accordingly coupling efficiency can be represented by (light_out/light_in)*100%. Additionally, residual intensity modulation refers to the light source intensity modulation that occurs when a light beam passes through a waveguide phase modulator and the phase of the light beam is modulated.

Figure 5:
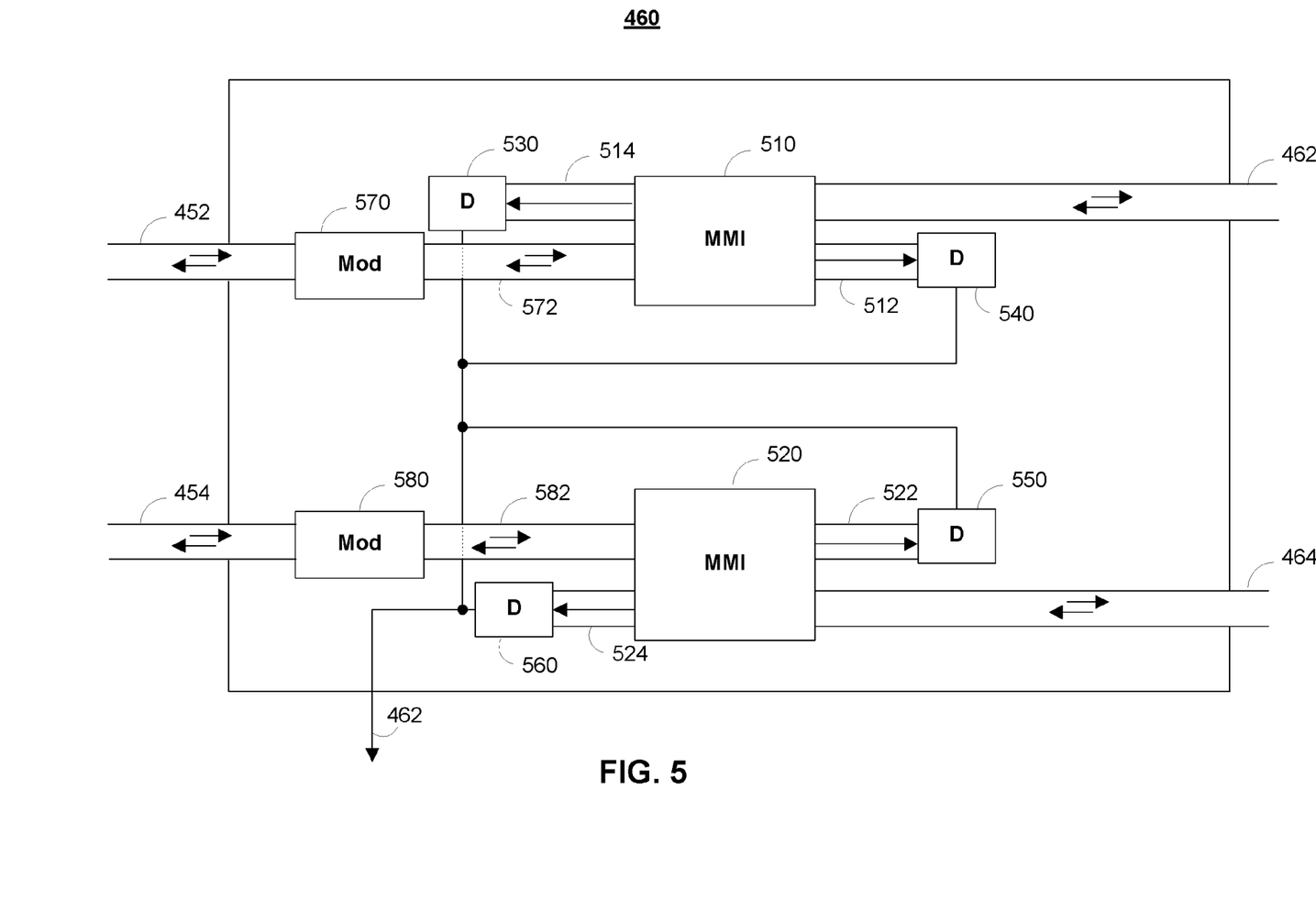
FIG. 5 is a schematic diagram of illustrative diagnostics and compensation circuitry used for determining light beam characteristics for measuring acceleration in accordance with an embodiment of the present invention.

FIG. 5 is a diagram of an illustrative diagnostics and compensation circuitry 460 used for determining light beam characteristics for measuring acceleration in accordance with an embodiment of the present invention. Diagnostics and compensation circuitry 460 includes modulators 570 and 580, detectors 530, 540, 550 and 560 and MMI couplers 510 and 520.

The diagnostics and compensation circuitry 460 is coupled to optical paths 452 and 454 to receive the respective light beam portions from MMI coupler 450 (FIG. 4). Each of the received light beam portions is passed through a respective modulator 570 and 580. The modulators 570 and 580 are preferably electro-optic modulators and are used to modulate the phase of the light beam portions while they traverse the free space 390 between the semiconductor optical accelerometer 110 and the external mirrors (FIG. 3). The modulators 570 and 580 may alternatively be constructed as acousto-optic modulators. Phase modulators offer a more robust response than the acousto-optic frequency shifters used in conventional systems. The one or more phase modulators may also be individually addressable. Individually addressable modulators can be driven and controlled on an individual basis which can thereby increase the complexity of the modulation scheme that is used and the accuracy of the accelerometer. The light beam portions leave the respective modulator and are directed along a respective optical path 572 or 582 towards the MMI coupler 510 or 520.

The MMI coupler 510 is coupled to optical path 572 and splits the light beam received from modulator 570 into two portions. MMI coupler 510 directs the two light beam portions along two parallel optical paths 462 and 512. The light beam portion propagating through optical path 462 will ultimately be reflected by reference mirror 170 (FIG. 3). The light beam portion propagating through optical path 512 is received and sampled by the detector 540. The detector 540 samples the light beam portion after the light beam passes through modulator 570 to measure the residual intensity modulation. Residual intensity modulation afflicts all waveguide type modulators. The detector 540 provides this measurement via path 462 to a microprocessor (not shown) for compensation of residual intensity modulation electronically in the computed acceleration. Similarly, the MMI coupler 520 is coupled to optical path 582 and splits the light beam portion received from modulator 580 into two portions. MMI coupler 520 directs the beam portions along two parallel optical paths 522 and 464. The light beam portion propagating through optical path 464 will ultimately be reflected by flexured mirror 160 (FIG. 3). The light beam portion propagating through optical path 522 is received and sampled by the detector 550 to measure its residual intensity modulation. The measurement made by detector 550 is also provided to processor via path 462.

The light beam portions are reflected by the external mirrors and are received by diagnostics and compensation circuitry 460 through optical paths 462 and 464. The MMI coupler 510 receives the light beam portion reflected by the reference mirror 170. The MMI coupler 510 splits and directs the reflected beam portion into two portions propagating along the two parallel optical paths 514 and 572. The optical path 572 guides the light beam portion towards the modulator 570 and ultimately to MMI coupler 450 (FIG. 4). The other optical path 514 guides the light beam portion towards the detector 530. Detector 530 measures coupling efficiency of light beam reflected by the reference mirror 170 (FIG. 3). The detector 530 outputs the measurements to a processor (not shown) via path 462 for normalizing the acceleration measurement. Similarly, the MMI coupler 520 also splits and directs the reflected light beam into two portions propagating along two parallel optical paths 582 and 524. The optical path 524 guides the light beam portion towards the detector 560 for measuring coupling efficiency of the light beam portion reflected by the flexured mirror 160 (FIG. 3). Detector 560 also outputs the measurements to a processor via path 462 for normalizing the acceleration measurement.

It should be understood that although only two MMI couplers 510 and 520 are drawn in FIG. 5, any number of MMI couplers may be placed in the optical path of the light beam to the external mirrors to measure additional light beam characteristics on the way to the external mirrors and after the light beams are reflected by the external mirrors. In particular, an MMI coupler may be positioned to receive a light beam on its way to the external mirrors and split the beam into two portions to direct one of the beam portions towards a detector and the other beam portion towards the external mirror. Similarly, after the beam portion is reflected by the external mirror, the MMI coupler may receive the reflected beam portion and split the beam portion into two portions, where one portion is directed towards a detector and the other portion is directed along an optical path to ultimately be used in measuring acceleration. Each detector can be configured to measure a light beam characteristic before the light beam portion leaves the semiconductor optical accelerometer and after the light beam portion is reflected by the external mirrors and re-enters the semiconductor optical accelerometer.

Figure 6:
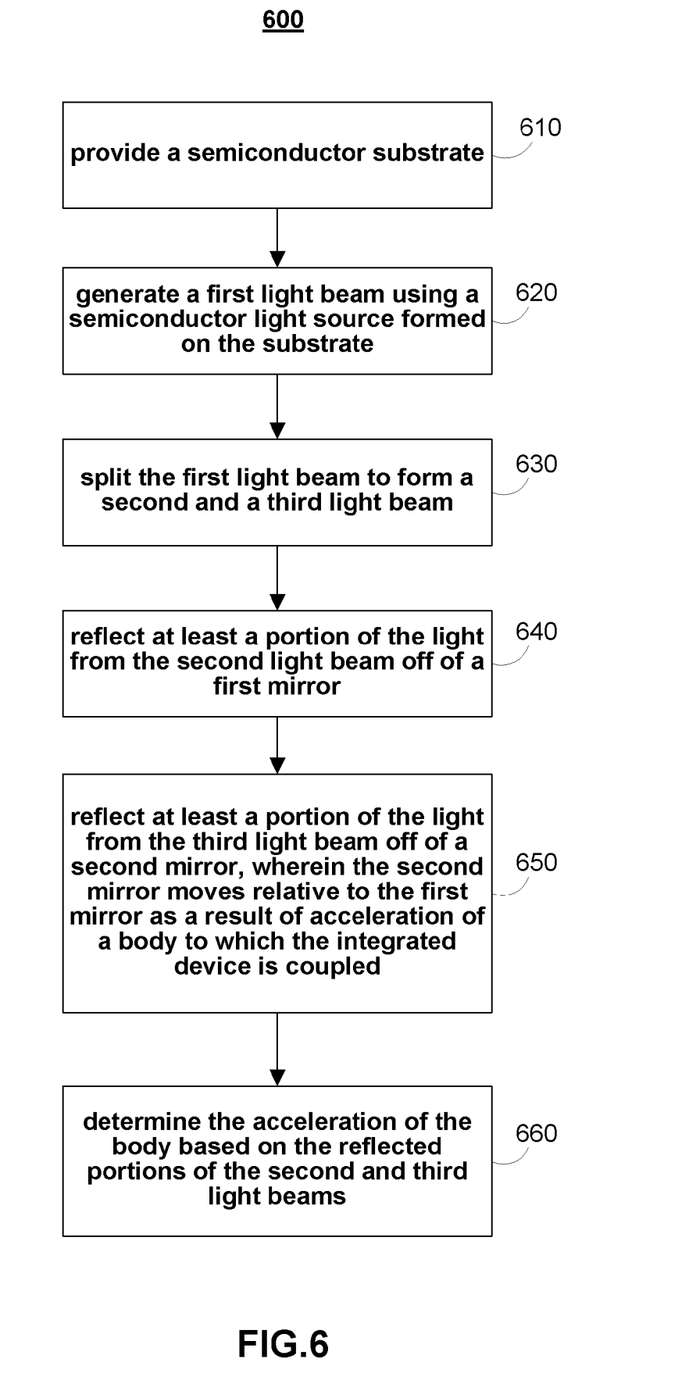
FIG. 6 illustrates a method for measuring acceleration using a semiconductor optical accelerometer in accordance with an embodiment of the present invention.

FIG. 6 illustrates a method 600 for measuring acceleration using an semiconductor optical accelerometer in accordance with an embodiment of the present invention. At step 610, a semiconductor substrate is provided. For example, as shown in FIGS. 2 and 3 semiconductor optical accelerometers 110a-b are provided.

At step 620, a first light beam is generated using a semiconductor light source formed on the substrate. For example, light source 310 generates a light beam 320 and directs the beam along an optical path 320 towards split and detect circuitry 330 (FIG. 3). The optical path 320 guides the light beam along the normal of the external mirrors.

At step 630, the first light beam is split to form a second and a third light beam. For example, as shown in FIG. 3, split and detect circuitry 330 is coupled to the optical path 320, receives the light beam 320 and splits the light beam to form at least two portions 334 and 336, referred to as the second light beam and third light beam respectively. The second light beam 334 is directed along an optical path 340 towards a reference mirror 170 while the third light beam 336 is directed along an optical path 350 towards a flexured mirror 160. The optical paths 340 and 350 guide the light beams along the normal of the external mirrors.

At step 640 at least a portion of the light from the second light beam is reflected off of a first mirror (e.g., the reference mirror 170). Reference mirror 170 reflects the second light beam 334 back towards the optical path 340 of the semiconductor optical accelerometer 110.

At step 650, at least a portion of the light from the third light beam is reflected off of a second mirror, where the second mirror moves relative to the first mirror as a result of acceleration of a body to which the integrated device is coupled. Flexured mirror 160 reflects the third light beam 336 back towards the optical path 350 in semiconductor optical accelerometer (FIG. 3). The flexured mirror 160 moves relative to the reference mirror 170 as a result of acceleration. Accordingly, the free space 390 between the semiconductor optical accelerometer 110 and the external mirrors may be different for the optical path adjacent to each mirror.

At step 660, the acceleration of the body is determined based on the reflected portions of the second and third light beams. The split and detect circuitry 330 receives the reflected light beams and combines the light beams to form an interference light beam (FIG. 3). The interference light beam is directed towards the detector 380 which provides various measurements to a microprocessor 360 to determine acceleration based on the reflected portions of the second and third light beams.

The above described embodiments of the present invention are presented for purposes of illustration and not of limitation, and the present invention is limited only by the claims which follow.

What is claimed is:

1. A method for measuring acceleration using an integrated device, the method comprising:
   providing a semiconductor substrate;
   generating a first light beam using a semiconductor light source formed on the substrate;
   splitting the first light beam using beam splitting circuitry formed on the substrate to form a second and a third light beam;
   reflecting at least a portion of the light from the second light beam off of a first mirror;
   reflecting at least a portion of the light from the third light beam off of a second mirror, wherein the second mirror moves relative to the first mirror as a result of acceleration of a body to which the integrated device is coupled; and
   determining the acceleration of the body based on the reflected portions of the second and third light beams.

2. The method of claim 1 further comprising:
   combining the reflected portions of the second and third light beams to form an interference light beam; and
   detecting characteristics of the first light beam and the interference light beam;
   wherein determining the acceleration of the body comprises analyzing differences between the detected characteristics of the first beam and the interference beam.

3. The method of claim 2 wherein the combining combines the portions of the second and third light beams without the use of a lens.

4. The method of claim 1 comprising:
   detecting non-acceleration-based changes to at least one of the first, second, and third light beams resulting from the light beams traversing at least a portion of an optical path from the semiconductor light source to a detector; and
   normalizing the determined acceleration based on the detected changes.

5. The method of claim 4 further comprising:
   splitting the second and third beams prior to the reflecting the portions of the light beams off of the first and second mirrors;
   measuring residual intensity modulation from portions of the second and third light beams resulting from the splitting of the second and third beams; and
   wherein the normalizing accounts for the measured residual intensity modulation.

6. The method of claim 4 further comprising:
   splitting each of the reflected portions of the second and third light beams;
   measuring changes in coupling efficiency from the reflected portions of the second and third light beams resulting from the splitting of the reflected portions of the second and third light beams; and
   wherein the normalizing accounts for the changes in the coupling efficiency.

7. The method of claim 4 wherein the changes are selected from the group consisting of intensity, noise and coupling efficiency.

8. The method of claim 1 wherein the acceleration is determined by detecting differences in relative phases of the reflected portion of the second beam and the reflected portion of the third beam.

9. The method of claim 1 further comprising increasing mode size of the second and third lights beams before reflecting the portions of the second and third light beams off of the first and second mirrors, wherein the increased mode size reduces divergence of the portions of the second and third light beams outside of the integrated device.

10. The device of claim 1 wherein the semiconductor light source is a superluminescent diode.

11. A device for measuring acceleration, the integrated circuit device comprising:
   a semiconductor substrate comprising an integrated optical path;
   a semiconductor light source formed on the semiconductor substrate operable to generate and direct a first light beam along a first portion of the optical path;
   a first multimode interference (MMI) coupler formed on the semiconductor substrate along the optical path that receives the first light beam and forms and directs a second light beam and a third light beam along second and third portions, respectively, of the optical path;
   a first mirror proximate to the semiconductor substrate oriented to reflect at least a portion of the light from the second light beam back towards the first MMI coupler;
   a second mirror proximate to the semiconductor substrate coupled to a body external to the device and oriented to reflect at least a portion of the light from the third light beam back towards the first MMI coupler, wherein the second mirror moves relative to the first mirror as a result of acceleration of the body; and
   a processor operable to compute the acceleration of the body based on characteristics of the respective reflected portions of the second and the third light beams reflected off of the first and second mirrors.

12. The device of claim 11 further comprising a detector formed on the semiconductor substrate that measures a characteristic of the portion of the third light beam reflected off of the second mirror.

13. The device of claim 11 wherein:
   the first MMI coupler combines the reflected portion of the second light beam and reflected portion of the third light beam and forms an interference light beam;
   the processor is further operable to:
      compare the first light beam with the interference light beam to detect differences between the first beam and the interference beam; and
      compute the acceleration of the body based on the detected differences between the first beam and the interference beam.

14. The device of claim 11 further comprising:
   a modulator formed on the semiconductor substrate along the optical path that modulates the second and third light beams before the portions of the second and third light beams are reflected by the first and second mirrors;
   a second MMI coupler formed on the semiconductor substrate along the optical path that receives the second light beam and forms and directs a first portion of the second light beam towards a first detector that measures residual intensity modulation, and directs a second portion of the second light beam towards the first mirror; and
   a third MMI coupler formed on the semiconductor substrate along the optical path that receives the third light beam and forms and directs a first portion of the third light beam towards a second detector that measures residual intensity modulation and directs a second portion of the third light beam towards the second mirror.

15. The device of claim 14 wherein:
   the second MMI coupler receives the second portion of the second light beam that is reflected off of the first mirror and forms and directs a third portion of the reflected second portion of the second light beam towards a third detector that measures coupling efficiency and directs a fourth portion of the reflected second portion of the second light beam towards the first MMI coupler;

the third MMI coupler receives the second portion of the third light beam that is reflected off of the second mirror and forms and directs a third portion of the reflected second portion of the third light beam towards a fourth detector that measures coupling efficiency and directs a fourth portion of the reflected second portion of the third light beam towards the first MMI coupler.

16. The device of claim 15 wherein:
the first MMI coupler combines the fourth portion of the reflected second portion of the second light beam with the fourth portion of the reflected second portion of the third light beam to form an interference beam; and
the processor is further operable to:
compute the acceleration of the body by comparing characteristics of the first beam with the characteristics of the interference beam; and
compensate for non-acceleration-based changes that occur in the light beams in traversing the optical path and normalize the computed acceleration based on values provided by at least one of the first, second, third and fourth detectors.

17. The device of claim 16 wherein the changes are selected from the group consisting of intensity, noise and coupling efficiency.

18. The device of claim 14 further comprising a mode converter formed on the semiconductor substrate along the optical path associated with each of the second and third MMI couplers, wherein the mode converter is operable to reduce divergence of the second portion of the second light beam and the second portion of the third light beam outside of the integrated device.

19. The device of claim 11 wherein the acceleration is computed by detecting differences in relative phases of the reflected portion of the second light beam and the reflected portion of the third light beam.

20. The device of claim 11 wherein the semiconductor light source is a superluminescent diode.

21. A system body that is subject to acceleration, the system body comprising:
a first mirror;
a second mirror the moves relative to the first mirror as a result of acceleration of the body;
a first semiconductor optical accelerometer coupled to a first part of the system body undergoing acceleration that provides a first measure of the acceleration of the body, wherein the first semiconductor optical accelerometer comprises a first semiconductor light source;
a second semiconductor optical accelerometer coupled to a second part of the system body undergoing acceleration that provides a second measure of the acceleration of the body, wherein the second semiconductor optical accelerometer comprises a second semiconductor light source, and wherein one of the first and second semiconductor optical accelerometers is configured to reflect light off of the first and the second mirrors in order to sense acceleration of the body; and
a processor coupled to the system body operable to output the acceleration of the body based on the first and second measures of the acceleration.

22. The system of claim 21 wherein each of the first and second semiconductor optical accelerometers comprises:
a semiconductor substrate comprising an integrated optical path;
a processor formed on the semiconductor substrate;
wherein the respective semiconductor light source formed on the semiconductor substrate is operable to generate and direct a first light beam along a first portion of the optical path; and
a multimode interference (MMI) coupler formed on the semiconductor substrate along the optical path that receives the first light beam and forms and directs a second light beam and a third light beam along second and third portions, respectively, of the optical path;
wherein:
the first mirror is oriented to reflect at least a portion of the light from the second light beam back towards the MMI coupler;
the second mirror is oriented to reflect at least a portion of the light from the third light beam back towards the MMI coupler; and
the processor is operable to provide the respective first and second measure of the acceleration of the body by computing the acceleration of the body based on characteristics of the reflected portions of the second and the third light beams reflected off of the first and second mirrors.

23. The system of claim 22 wherein the third processor outputs the improved value by computing an average of the first and second instances of acceleration of the body.

24. The device of claim 21 wherein one of the first and second semiconductor light sources is a superluminescent or laser diode.

* * * * *